United States Patent [19]

Thiele

[11] 3,970,127
[45] July 20, 1976

[54] MACHINE TOOL WORKPIECE FEED CARRIAGE

[75] Inventor: Siegfried Thiele, Minden-Haverstadt, Germany

[73] Assignee: Wilhelm Altendorf, Maschinenbau, Minden, Westphalia, Germany

[22] Filed: Feb. 26, 1975

[21] Appl. No.: 553,511

[30] Foreign Application Priority Data

Feb. 27, 1974 Germany............................ 2409420

[52] U.S. Cl.............................. 144/242 R; 90/18; 90/58 R; 308/3 A
[51] Int. Cl.².......................................... B27C 1/12
[58] Field of Search ........ 144/245 R, 242 R, 278 R; 269/55, 56; 76/19, 20; 83/3, 435.1, 474, 475, 476; 90/18, 19; 248/420, 429, 430; 38/3 A, 3.6, 3.8

[56] References Cited
UNITED STATES PATENTS

| | | | |
|---|---|---|---|
| 309,101 | 12/1884 | Samuel............................ | 144/278 R |
| 2,173,587 | 9/1939 | Huffman.......................... | 308/3 A |
| 2,383,195 | 8/1945 | Horman......................... | 83/435.1 X |

*Primary Examiner*—Al Lawrence Smith
*Assistant Examiner*—Gary L. Smith
*Attorney, Agent, or Firm*—Spencer & Kaye

[57] ABSTRACT

In a feed carriage for holding a workpiece, the carriage being mounted on a housing of a machine equipped with a working tool, and being located to one side of the tool, the carriage including a lower carriage portion and an upper carriage portion mounted for movement on the lower carriage portion, each portion being composed in the form of a light-metal profile, and the upper carriage portion and the lower carriage portion extending far beyond the machine housing in the direction of the length of the carriage, the upper carriage portion is constituted by a one-piece unit and is provided, on the side thereof adjacent the tool, with a closed profile member whose side facing the tool constitutes an outer wall which extends at an angle of approximately 45° with respect to the clamping surface formed by the upper carriage portion.

6 Claims, 3 Drawing Figures

MACHINE TOOL WORKPIECE FEED CARRIAGE

BACKGROUND OF THE INVENTION

The present invention relates to a feed carriage for holding workpieces in machine tools for machining wood or plastic, e.g. for circular saws or milling cutters.

Carriages of this type include an upper portion in the form of a light-metal profile with a clamping surface for the workpiece, a lower portion in the form of a light-metal profile which is to be fastened to the machine housing, and a center portion on which the upper portion is movably supported, as well as sets of guide rollers which are permanently connected together, the upper portion and the lower portion extending far beyond the machine housing in their longitudinal direction.

Various forms of construction of feed carriages of the above-mentioned type are known in the art. In most cases the upper and lower carriage portions have a U-shaped profile configuration, and a lip extends from the upper carriage in the direction toward the tool. In the case of machines in which the tool can be pivoted up to an angle of 45° the carriage must have an oblique portion, at the side facing the tool, which extends at an angle of 45° so that the lip on the upper carriage portion extends laterally far beyond the lower carriage portion.

The lower carriage portion usually has a trapezoidal design and is fastened to the machine housing via the short base of the trapezoid. Due to the overhang of the upper portion at only one lateral side thereof, the entire feed carriage is subjected to torsional stresses which result in the production of uneven edges on the workpieces as they are being machined.

Attempts have therefore been made to support the upper carriage portion at the machine housing by means of additional contact rollers. This, however, has the drawback that in such a case the lower carriage portion and the additional contact rollers must be precisely aligned with one another, since otherwise the upper carriage portion would be twisted during its movement and this would again result in inaccurately machined workpieces. A further drawback is that such additional support is possible only within the region of the machine housing.

In order to obtain a sufficiently wide clamping surface for the lower carriage portion, the upper carriage portion must of necessity be rather wide so that the operator who stands to the side of the feed carriage is required to lean over the feed carriage during its longitudinal travel.

For these reasons it has been the custom to produce two different types of feed carriage, a small and stable one for machines with a stationary tool and a wider and less stable one, which nevertheless is more complicated, for machines having a pivotal tool.

SUMMARY OF THE INVENTION

It is therefore an object of the present invention to provide a torsion-resistant feed carriage of the above-described type which can be used to equal advantage for machines with stationary as well as pivotal tools.

This and other objects are accomplished according to the present invention by making the light-metal profile of the upper carriage portion of one piece, with a closed profile member, located on the side facing the machine tool, the closed profile member having an outer wall lying at an angle of about 45° with the clamping surface. The term "closed profile" employed herein denotes a configuration which, in a plane perpendicular to the length of the profile member, has the form of a closed path enclosing a hollow space.

The closed profile member supports a lip of the carriage which protrudes laterally by a substantial amount, and the closed profile member forms a torsion-resistant unit which extends the entire length of the upper carriage portion and which opposes twisting under load stresses.

Since the outer wall of the profile member extends at an angle of about 45° with respect to the clamping surface, it is possible to use the feed carriage according to the invention also for machines having a pivotal tool. The tool can, when pivoted, extend inwardly underneath the upper carriage portion. The closed profile member of the upper carriage portion seals the sets of guide rollers off from the tool, so that excessive soiling of the sets of guide rollers or guide rails, respectively, and the resulting inaccuracies in their paths are avoided.

According to an advantageous embodiment of the invention, the closed profile member is provided with a free arm which forms an extension of the outer wall, and this free arm is provided on its inside with a supporting roller which rolls on a guide path of the lower carriage portion. As a result, the upper carriage portion is supported not only on sets of guide rollers but also directly on the lower carriage portion by way of an additional supporting roller. This support is provided over the entire length of the lower carriage portion, not just in the region of the machine housing, so that there results an extremely torsion-resistant connection with the closed profile of the upper carriage portion. The forces occurring in the area of the table lip are directly dissipated to the lower carriage portion and the free arm disposed as an extension of the outer wall of the closed profile member shields the supporting roller against extraneous influences, particularly dirt. Since the upper carriage portion is supported exclusively at the lower carriage portion and not at the machine housing, either by the sets of guide rollers or by the supporting roller, the otherwise required mutual alignment of the sets of guide rollers and of the rollers at the machine housing is eliminated.

A favorable embodiment of the invention results if the profile of the lower carriage portion is made of two closed profile members which each are made of one piece and which are connected together via a common partition, the partition being coplanar with the free arm of the closed profile member of the upper carriage portion. Thus, the partition is oriented at an angle of about 45° to the clamping surface and is located in the manner of an extension of the free arm.

The two closed profile members of the lower carriage portion contribute to the torsion-resistance of the entire feed carriage. When such a carriage is used for a machine with a pivotal tool, it is merely necessary to remove a section of one profile member of the lower carriage portion in the region of pivot movement of the tool. The remaining profile member of the lower carriage portion remains untouched and keeps the lower carriage portion torsion-resistant even in the region of the removed profile section. The two closed profile members together form a large contact surface which permits fastening of the lower carriage portion to the machine housing in a manner such that the carriage is secure against tilting.

DESCRIPTION OF THE PREFERRED EMBODIMENTS

Figure 1:
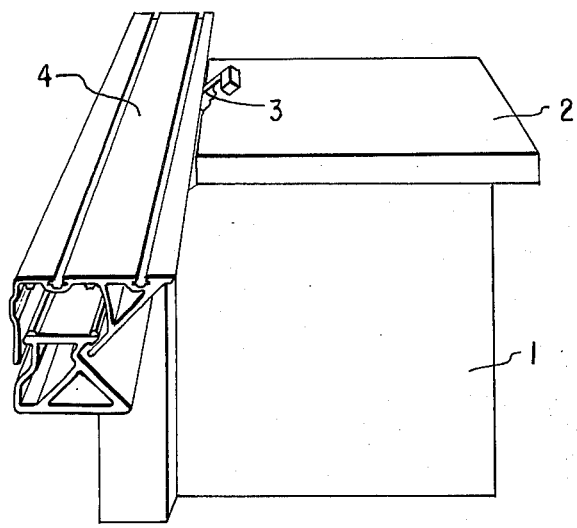
FIG. 1 is a perspective view of a circular table saw equipped with a feed carriage constituting a preferred embodiment of the present invention.

The circular saw shown generally in FIG. 1 includes a machine housing 1, a machine table 2 with a circular saw blade 3 with protective blade guard. The blade 3 passes upwardly through table 2 and the machine further includes a feed carriage 4 according to the invention which is mounted next to blade 3 and which is movable along a path parallel to the tool plane. As can be seen in FIG. 1, the feed carriage 4 protrudes, in the direction of its length, far beyond the machine housing 1.

Figure 3:
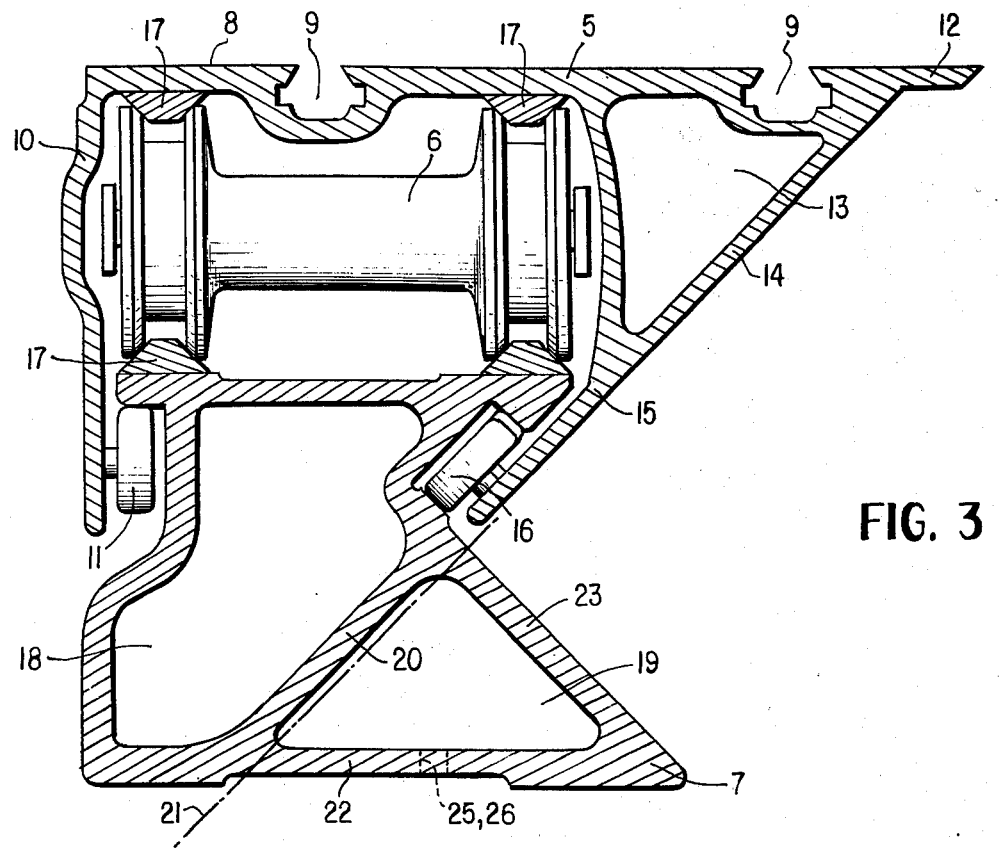
FIG. 3 is a cross-sectional end view of the feed carriage shown in FIGS. 1 and 2.

The structure of feed carriage 4 can be seen in greater detail in FIG. 3. It includes an upper carriage portion 5 which rolls on a lower carriage portion 7 via one or more sets of guide rollers 6.

As can be seen in FIG. 3, the upper carriage portion 5 is made of a one-piece light-metal e.g. aluminum, profile.

Upper carriage portion 5 has a clamping surface 8 with clamping grooves 9 for clamping on the workpieces. Grooves 9 are laterally offset with respect to the guide rollers of set 6. Due to this lateral offset of the clamping grooves, it is possible to use larger guide rollers for the sets of guide rollers, i.e. the rollers can extend above the bottoms of regions defining the grooves 9. At the lateral side of the clamping surface 8 facing away from the tool, a free arm 10 extends downwardly to the lower carriage 7 so as to cover the sets of guide rollers 6. Arm 10 is supported at the lower carriage portion 7 by means of a support roller 11.

At the lateral side facing the tool 3, the clamping surface 8 ends in a laterally protruding lip 12. Next to the guide rollers 6 and below the clamping surface 8 and lip 12, there is provided a closed profile member 13 which forms a unit with the rest of the profile 5 and which includes an outer wall 14 facing the tool 3 and extending at an angle of about 45° to the clamping surface, or clamping plane. This closed profile member 13, which has an approximately triangular cross section forms, together with the rest of the profile, an extremely torsion-resistant unit.

In extension of the outer wall 14, there is provided a free arm 15 carrying, in a manner similar to arm 10, a supporting roller 16 which is supported at the lower carriage portion 7. The supporting roller 16 is inclined, as is the outer wall 14, at an angle of 45°. The two supporting rollers 11 and 16 together prevent the upper carriage portion from tilting with respect to, or being lifted from, the lower carriage portion 7. With the aid of the supporting roller 16, the forces occurring in the region of the lip 12 are directly transferred to the lower carriage portion 7 so that no significant torsion can develop. Furthermore, the closed profile member 13 gives the upper carriage portion 5 a previously unattainable bending strength in the longitudinal direction.

Between the upper carriage portion 5 and the lower carriage portion 7 there are disposed the above-mentioned sets of guide rollers 6, the rollers of each set usually being rigidly connected to one another, which constitute the so-called center carriage. The sets of guide rollers travel in so-called guide rails 17 on the upper and lower carriage portions.

The lower carriage portion 7 is composed essentially of two closed profile members 18 and 19 which are connected together by means of a common partition 20 to form a one-piece unit. This partition 20 is located in the manner of an extension of the free arm 15 of the upper carriage portion and extends at an angle of 45° with respect to the clamping surface 8 of the upper carriage portion 5. While one of the two closed profile members, 18, has, in principle, a trapezoidal shape and is provided with recesses for the support rollers 11 and 16 which engage therein from the upper carriage, the other profile member 19 has an approximately triangular cross section. Both profile members together make the lower carriage extremely resistant to torsion and bending.

The 45° angle of the orientation of partition 20 presents two advantages at once. Firstly, the forces transmitted by the support roller 16 are transmitted directly. Secondly, this partition 20 offers the possibility of removing a section of the triangular profile member 19 in the region of the tool, along the illustrated parting line 21, so that a pivotal tool can be pivoted even in a region below the lower carriage portion 7.

Figure 2:
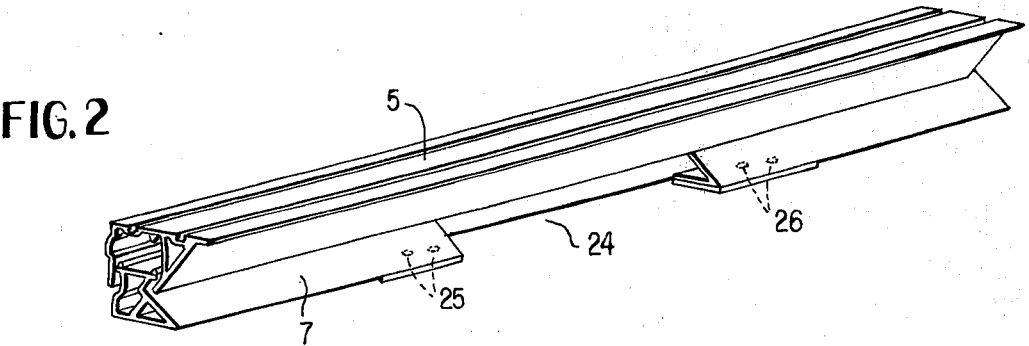
FIG. 2 is a perspective view of the feed carriage shown in FIG. 1.

The two illustrated sides 22 and 23 of the triangle of the closed profile member 19 are thus removed in such region, as can be seen most clearly in FIG. 2, so that a recess 24 results. Since this recess 24 is rather small compared to the entire cross-sectional area of the lower carriage portion 7, the closed profile member 18 which remains as the remaining cross section has sufficient dimensions to prevent any deformation by the occurring forces.

As can be seen in FIG. 2, the lower carriage portion 7 is connected with the machine housing 1 by means of screws at points 25 and 26 located at both sides of recess 24. FIG. 3 shows that these points are disposed approximately in the center of the triangular closed profile member 19. Since this profile is cut open in the area of the recess, the fastening points are also accessible from the area of the recess, which is particularly helpful for the placement of nuts or similar elements to secure the fastening screws.

Since the recess 24 is disposed between the clamping points 25 and 26, i.e. in an area subject to little stress, and since in this region the closed profile member 18 is maintained completely intact, high bending strength and torsion resistance are also assured in this section of the lower carriage portion as in the other sections thereof.

In order to keep the clamping surface of the lower carriage portion 7 as large as possible and the lower carriage portion profile very stable in the area which extends beyond the machine housing, the triangle side 23 of the closed profile member 19 should extend outwardly at an angle of 45°, if possible.

Since the removal of the lower carriage profile member 19 in the region of the recess 24 does not produce a reduction in the stability of the feed carriage 4, the carriage can be used advantageously in machines with a stationary tool as well as in those with a pivotal tool, particularly since it does not lose, but rather provides improvements in, the advantages of a carriage for a stationary tool, i.e. narrow width with highest stability.

It will be understood that the above description of the present invention is susceptible to various modifications, changes and adaptations, and the same are intended to be comprehended within the meaning and range of equivalents of the appended claims.

I claim:

1. In a feed carriage for holding a workpiece, the carriage being mounted on a housng of a machine equipped with a working tool, and being located to one side of the tool, the carriage including: an upper carriage portion in the form of a light-metal profile presenting a clamping surface for the workpiece; a lower carriage portion in the form of a light-metal profile fastened to the machine housing; and a center carriage composed of guide rollers on which the upper carriage portion moves and which supports the upper carriage portion on the lower carriage portion, the upper carriage portion and the lower carriage portion extending far beyond the machine housing in the direction of the length of the carriage, the improvement wherein said upper carriage portion is provided with a free arm member which extends downwardly at an angle of approximately 45° with respect to said clamping surface and said lower carriage portion comprises two closed profile members constituting a one-piece unit and including a common partition connecting said profile members together, said partition being positioned to constitute an extension of said free arm member.

2. Feed carriage as defined in claim 1 wherein said upper carriage portion is constituted by a one-piece unit and is further provided, on the side thereof adjacent the tool, with a closed profile member which is integral with said free arm member and whose side facing the tool constitutes an outer wall which extends at an angle of approximately 45°, and said free arm member extends downwardly from said closed profile member in a direction to constitute an extension of said outer wall.

3. Feed carriage as defined in claim 2 wherein said lower carriage portion is provided with at least one guide path and said upper carriage portion further comprises a first supporting roller rotatably mounted on said free arm member at the side thereof which is inwardly directed of said upper carriage portion, and in rolling engagement with said guide path.

4. Feed carriage as defined in claim 1 in a machine having a pivotally mounted tool, wherein that one of said closed profile members of said lower carriage portion which is located at the side of said carriage directed toward the tool has a section removed to provide a space which permits pivoting of the tool.

5. Feed carriage as defined in claim 1 wherein said lower carriage portion is formed so that one of its said closed profile members has a triangular cross section and has a horizontal base constituting the lower surface of said carriage.

6. Feed carriage as defined in claim 5 further comprising means connecting said lower surface of said carriage to the machine housing.

* * * * *